(12) United States Patent
Stracke

(10) Patent No.: US 9,677,275 B2
(45) Date of Patent: Jun. 13, 2017

(54) ANCHOR, TENSIONING DEVICE, WIND ENERGY PLANT AND METHOD FOR TENSIONING TENSILE CORDS ON AN ANCHOR

(71) Applicant: Wobben Properties GmbH, Aurich (DE)

(72) Inventor: Olaf Stracke, Emden (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/653,261

(22) PCT Filed: Dec. 2, 2013

(86) PCT No.: PCT/EP2013/075282
§ 371 (c)(1),
(2) Date: Jun. 17, 2015

(87) PCT Pub. No.: WO2014/095330
PCT Pub. Date: Jun. 26, 2014

(65) Prior Publication Data
US 2015/0330077 A1   Nov. 19, 2015

(30) Foreign Application Priority Data

Dec. 18, 2012   (DE) .................. 10 2012 223 616

(51) Int. Cl.
*E04C 5/08* (2006.01)
*E04C 5/12* (2006.01)
(Continued)

(52) U.S. Cl.
CPC .............. *E04C 5/12* (2013.01); *E02D 27/425* (2013.01); *E04B 1/585* (2013.01); *E04C 5/122* (2013.01);
(Continued)

(58) Field of Classification Search
CPC .......... E04H 12/12; E04H 12/16; E04H 12/34; E04H 12/342; F03D 11/04; F03D 11/045;
(Continued)

(56) References Cited

U.S. PATENT DOCUMENTS 4,367,568 A * 1/1983 Weiser ................. E04C 5/122
24/122.6
4,405,114 A    9/1983 Macchi
(Continued)

FOREIGN PATENT DOCUMENTS

DE       1559526 A1    12/1969
DE     34 27 901 A1     2/1986
(Continued)

*Primary Examiner* — Beth Stephan
(74) *Attorney, Agent, or Firm* — Seed Intellectual Property Law Group LLP

(57) ABSTRACT

The invention relates to an anchor, more particularly a fixed anchor, for a tensioning device designed for attachment on a construction for holding tensile cords, such as wires, rods, more particularly tensile wires, tension rods, or the like on the anchor, with a multi-part anchor head, wherein the anchor head has an anchor plate in the form of a perforated disc with a feed-through for separately guiding a tensile cord, wherein the feed-through is one of a number of feed-throughs and the tensile cord is one of a number of tensile cords, as well as an intermediate disc mounted on one side of the perforated disc and having a further feed-through for separately guiding the tensile cord, wherein the further feed-through is one of a number of further feed-throughs in the intermediate disc and the tensile cord is the one of the number of tensile cords. According to the invention it is proposed that the intermediate disc is formed as a transition plate which supports at least in the further feed-through a security sleeve which is designed to anchor the tensile cord automatically under tension.

26 Claims, 8 Drawing Sheets

(51) Int. Cl.
*E04B 1/58* (2006.01)
*E04H 12/34* (2006.01)
*E02D 27/42* (2006.01)
*E04H 12/16* (2006.01)

(52) U.S. Cl.
CPC ............. *E04H 12/16* (2013.01); *E04H 12/34* (2013.01); *E04B 2001/5887* (2013.01); *Y02B 10/30* (2013.01)

(58) Field of Classification Search
CPC .. F04C 5/08; F05B 2240/90; F05B 2240/917; E04C 5/12; E04B 1/585
USPC ........... 52/223.1, 223.4, 223.5, 223.6, 223.7, 52/223.8, 223.9, 223.11, 223.14, 745.21, 52/231
See application file for complete search history.

(56) References Cited

U.S. PATENT DOCUMENTS

| | | | | |
|---|---|---|---|---|
| 4,744,691 | A * | 5/1988 | Thal | E04C 5/122 24/136 R |
| 5,289,626 | A * | 3/1994 | Mochida | E02D 5/76 29/452 |
| 5,469,677 | A | 11/1995 | Lüthi | |
| 5,809,711 | A * | 9/1998 | Werner | E01D 2/00 52/223.2 |
| 6,578,328 | B2 | 6/2003 | Bournand et al. | |
| 6,578,329 | B1 * | 6/2003 | Stubler | E01D 19/14 24/122.6 |
| 7,174,684 | B2 * | 2/2007 | Nuetzel | E04C 5/122 52/223.13 |
| 7,181,890 | B2 * | 2/2007 | Nuetzel | E04C 5/122 52/223.13 |
| 7,234,280 | B2 * | 6/2007 | Nieto | E04H 7/20 52/223.13 |
| 7,343,718 | B2 * | 3/2008 | Foust | E04C 3/32 264/228 |
| 7,418,820 | B2 | 9/2008 | Harvey et al. | |
| 7,694,473 | B2 * | 4/2010 | Jakubowski | E04H 12/085 52/223.13 |
| 7,752,825 | B2 | 7/2010 | Wobben | |
| 7,857,542 | B2 * | 12/2010 | Burtscher | E04C 5/07 403/369 |
| 2003/0000165 | A1 * | 1/2003 | Tadros | E04C 3/22 52/223.4 |
| 2005/0034392 | A1 | 2/2005 | Nuetzel et al. | |
| 2010/0278593 | A1 * | 11/2010 | Cook | E21D 21/008 405/259.3 |

FOREIGN PATENT DOCUMENTS

| | | |
|---|---|---|
| DE | 33 39 125 C2 | 10/1987 |
| DE | 92 06 827 U1 | 8/1992 |
| DE | 198 33 273 A1 | 1/2000 |
| DE | 198 58 001 A1 | 6/2000 |
| DE | 100 31 683 A1 | 1/2002 |
| DE | 101 26 912 A1 | 12/2002 |
| EA | 006363 B1 | 12/2005 |
| EP | 0 197 912 A2 | 10/1986 |
| EP | 0 949 389 B1 | 6/2004 |
| EP | 1 505 223 A1 | 2/2005 |
| EP | 1227200 B1 | 6/2008 |
| EP | 2 339 094 A1 | 6/2011 |
| EP | 1 303 676 B1 | 1/2012 |
| JP | 57051738 U1 | 9/1982 |
| JP | 6138826 A | 2/1986 |
| JP | 61211555 A | 9/1986 |
| JP | 6383317 A | 4/1988 |
| WO | 98/41709 A1 | 9/1998 |
| WO | 00/36222 A1 | 6/2000 |

* cited by examiner

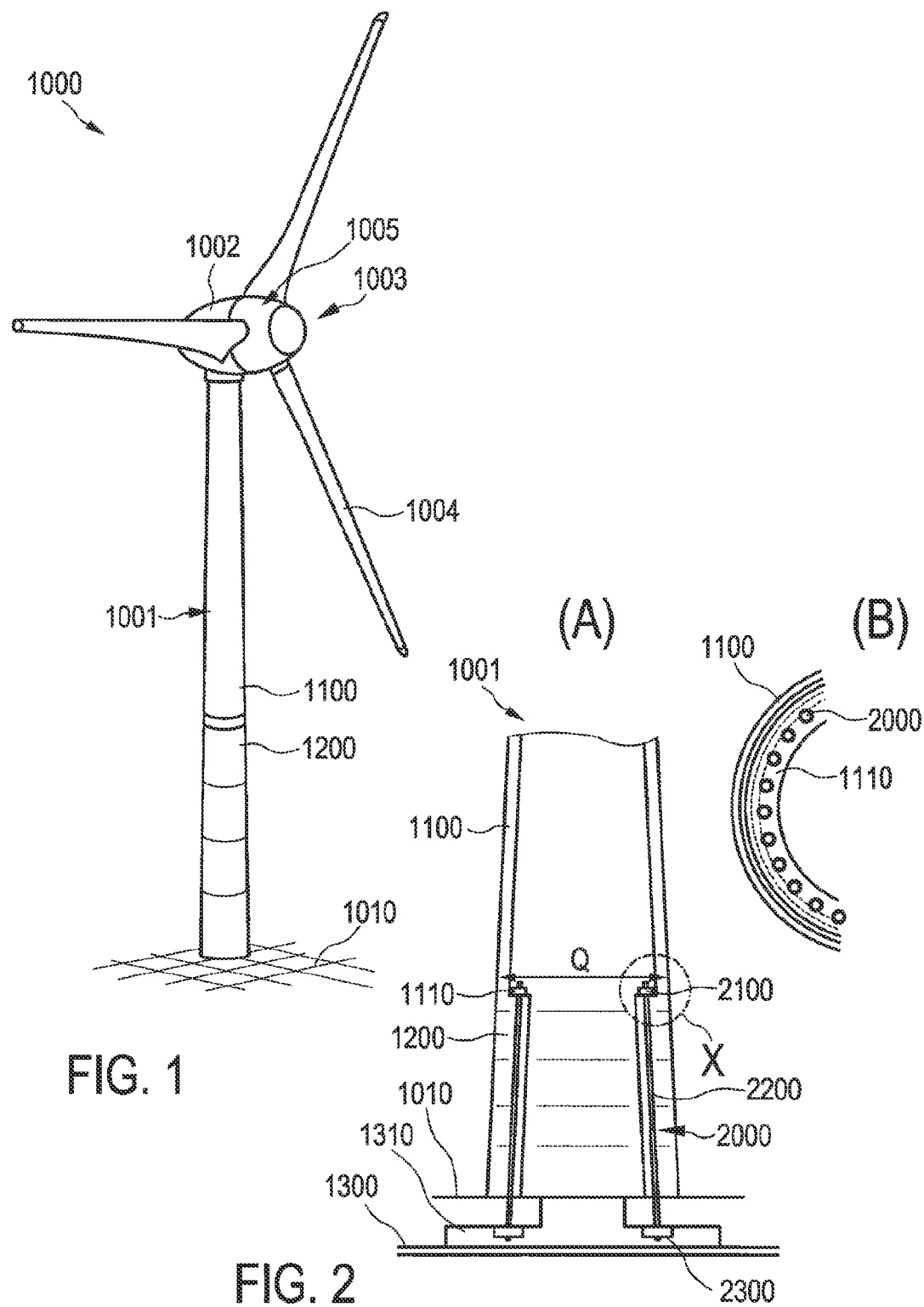

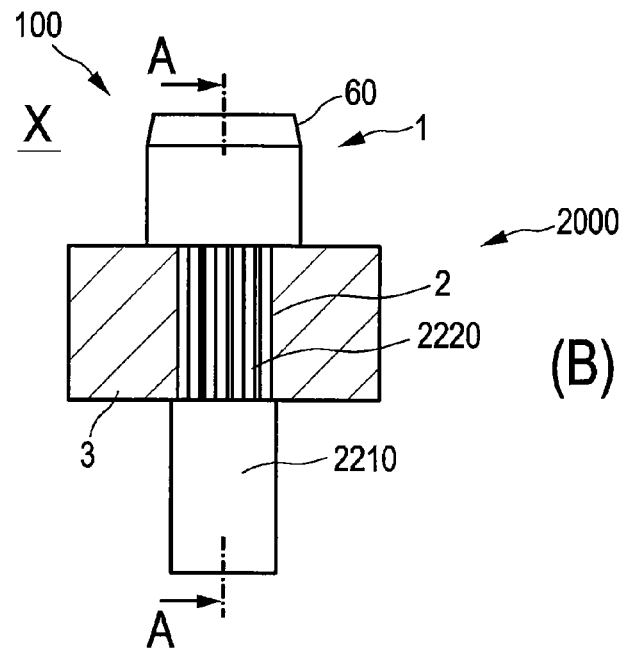
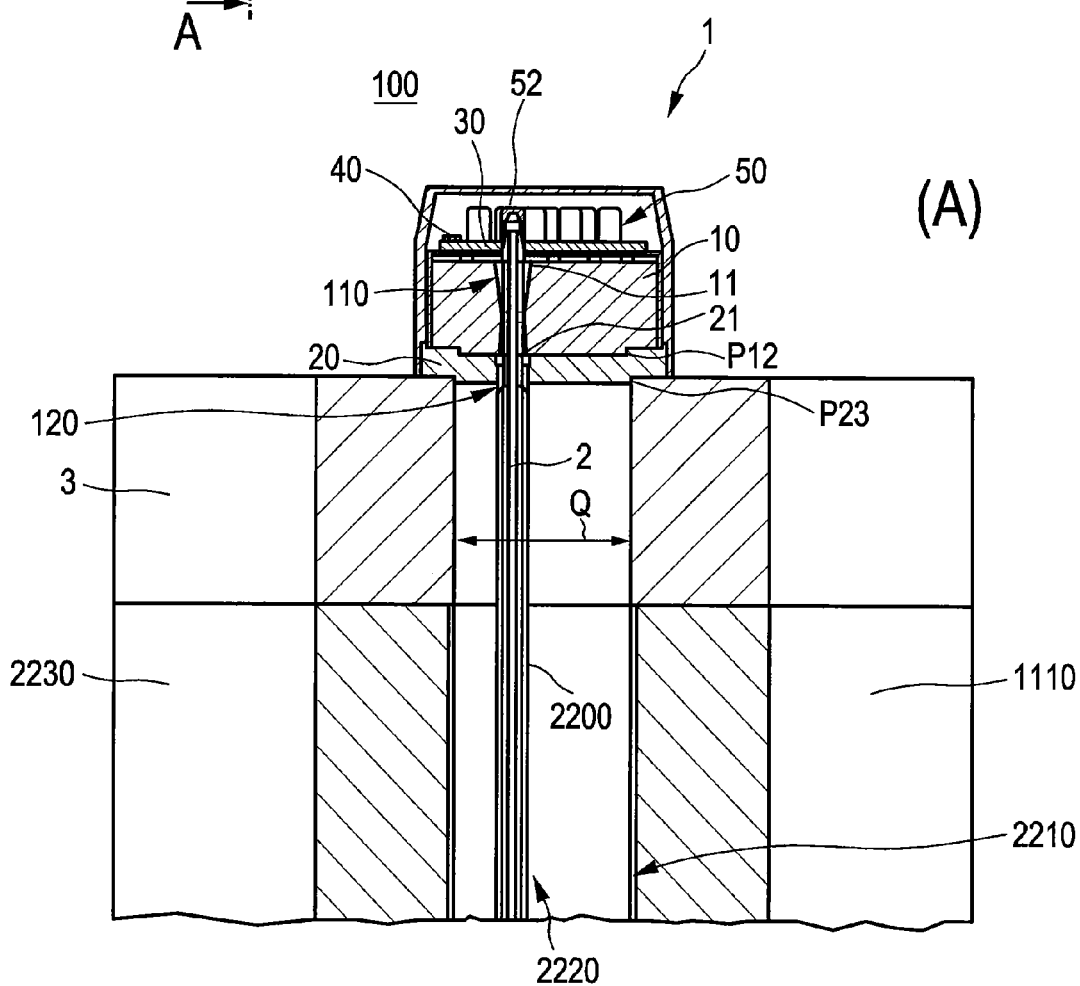
FIG. 4

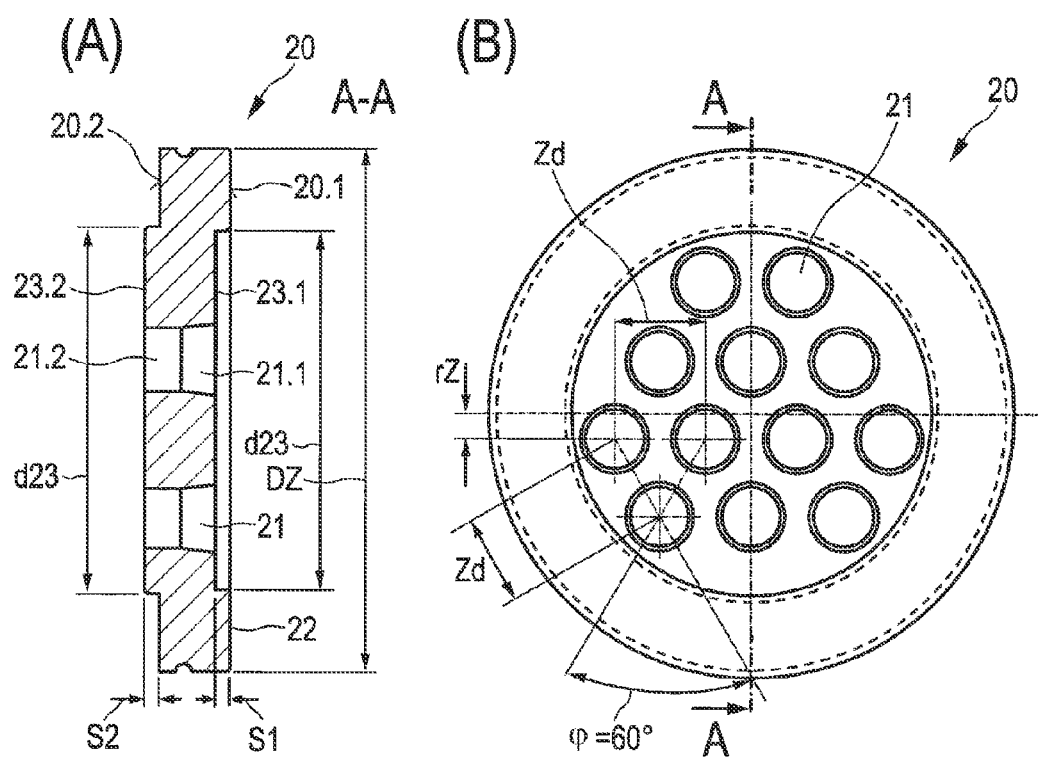
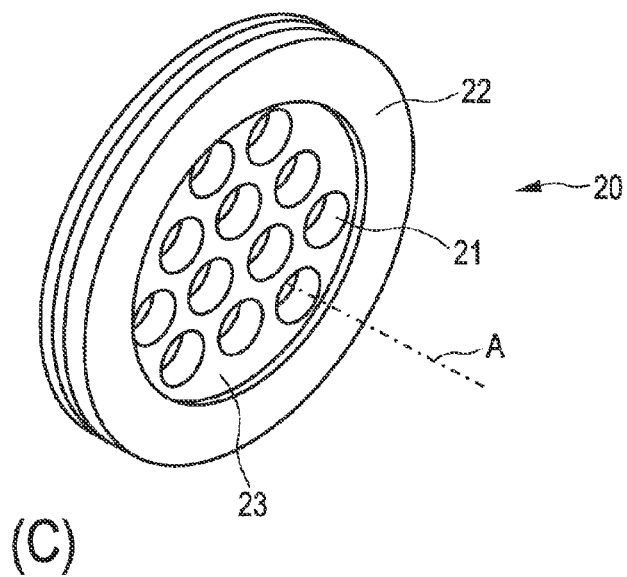
FIG. 5

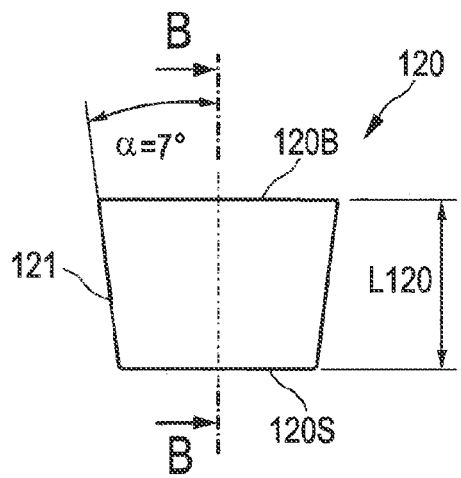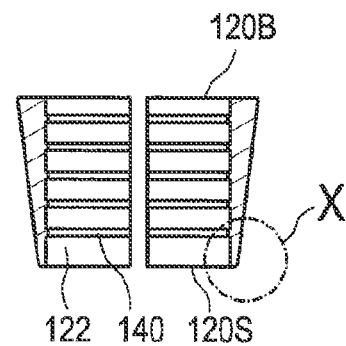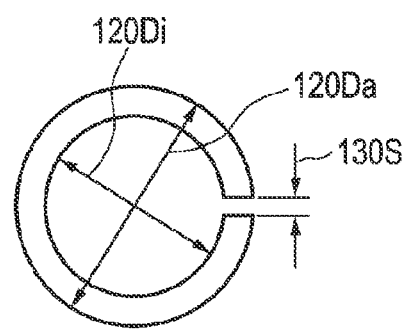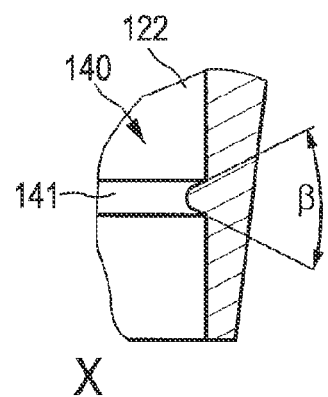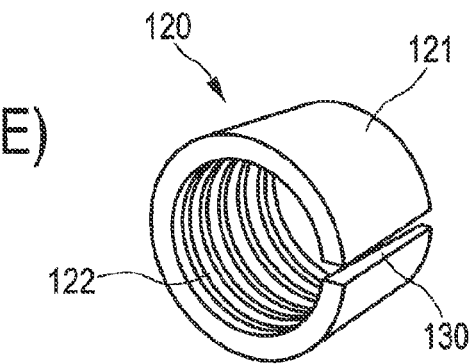
FIG. 6

ANCHOR, TENSIONING DEVICE, WIND ENERGY PLANT AND METHOD FOR TENSIONING TENSILE CORDS ON AN ANCHOR

BACKGROUND

Technical Field

The invention relates to an anchor. The invention further relates to a tensioning device, a wind energy plant and a method for tensioning tensile cords on an anchor.

Description of the Related Art

In order to reinforce pre-stressed concrete constructions, more particularly in the field of pre-stressed concrete towers, such as for example a tower on a wind energy plant, tensioning wires are used, which by applying a tensile force create tensioning and strengthening of the structure; particularly in the case of a pre-stressed concrete tower of a wind energy plant made up of a number of tower segments, one individual tower segment or a first and a second tower segment or the number of tower segments per se are set under tensile stress individually or with one another. In general a tensioning device is designed for attachment to a construction and for holding tensile cords on a structure such as by way of example the tower of a wind energy plant. In the case of wind energy plants, the fixed connection is achieved for example by bringing together the tensioning or tensile wires or a rod or the like singly or in bundles to form one tensile cord and are anchored to the foundation base; an anchor of the tensioning device, here called a tension anchor, normally serves for this purpose.

The tension anchor is connected via one or more tensile cords to a fixed anchor at a different point of the structure, and by applying tensile stress between the tension anchor and the fixed anchor can produce the tensile stress on a component part or between the component parts of a structure, such as by way of example tower segments of a tower. A tension anchor differs from a fixed anchor in that the tension anchor has engagement means for fitting a tensioning tool, more particularly a tension anchor is designed to move a tensile cord against the tension anchor to thus set this under tensile stress. A fixed anchor has on the other hand no function means for changing or increasing the tensile stress of a tensile cord; rather a fixed anchor serves to be fixed at a suitable point of the structure in concrete or on a concrete component, in order to hold one or more tensile cords on the fixed anchor.

Anchoring the tensioning device or the tensile cords on the tension anchor is preferably carried out by fastening the tensioned tension wires by way of example by means of a previously explained tension anchor (also called a tensile anchor) on for example a roof of the tower basement. This fastening is carried out typically by passing the tension wires through a corresponding opening in the basement roof when working in the tower basement, wherein the wires are then tensioned by a hydraulic stamping device and then fastened against the roof by means of a tension anchor.

From DE 100 31 683 A1 a pre-stressed concrete tower is known by way of example for a wind energy plant with a foundation base, a tower made substantially of concrete and at least one cable-like tensioned steel element for tensioning the tower. It is thereby proposed that the tensioned steel element is fixed by means of tension pockets arranged on the tower.

EP 1 303 676 B1 discloses a tower of a wind energy plant having a plurality of prefabricated segments arranged one on the other and tensioned together by means of tensioning elements wherein each prefabricated segment has a ring element. In order to guide tension wires or such tensile cords in an improved way at the joining points of the individual tower segments it is proposed that one ring element has a guide device for guiding a tension wire at the transitions between the prefabricated segments wherein the guide device has a tubular section at one end.

An anchoring device for tensile members having an anchorage body through which the tension member is guided is described in general in EP 0 949 389 B1 and has two anchor wedges which are arranged around the tensile member and by means of which the tensile member is fixed in the anchorage body. A protection element is thereby provided which is arranged between the anchor wedges and the tensile member so that the force enters the tensile member indirectly via the protection element. The surfaces of the anchor parts which are in contact with the protection element and/or the surface of the protection element which is in contact with the anchor parts is provided with recesses.

An external tensioning member mentioned at the beginning and including a tensile member which is encased by a flexible tube whose hollow cavities are filled after tensioning with a hardening mass, is known from DE 198 58 001. A fixed anchor called an end anchorage is described therein where the tension elements of a tensioning member are anchored on a perforated disc by means of fastening elements formed as a wedge. The tension elements each run inside an anchorage area inside a small transition tube which has at one end an external thread with which it is screwed into an associated threaded bore in an intermediate plate. At the other end each small transition tube is inserted fixedly into an associated bore of a sealing disc. The bore has a narrow area which closely surrounds the tension element which is passing through same. At a distance from the aforementioned sealing disc there is a second sealing disc with narrow bores wherein the internal space between the two sealing discs corresponds at least to the intended re-tensioning path.

This design enables a comparatively reliable fixed anchor to be formed which is moreover in a position to protect a tension element against damp. An anchor of this kind can however still be further improved.

DE 15 59 526 discloses a fastening element for an anchor as an anchor part which touches the wires and is provided with recesses which adapt to the shape and the path of the wires.

From DE 92 06 827 a wedge anchor for cords or wires has become known having at least one substantially frusto-conical wedge including wedge segments for inserting in a conical bore of an anchor body.

A drawback of the previous designs of an anchor lies in the fact that these seek to overcome the sealing problems in a way which is comparatively expensive and although they may be comparatively secure they do however require a large structural space. This structural space is however only available in a limited amount particularly in the case of industrial towers. It is desirable to design an anchor and a method for attaching an anchor in a simpler but nevertheless secure way.

The German Patent and Trade Mark Office has searched in the priority application the following prior art: DE 33 39 125 C2, DE 34 27 901 A1, DE 101 26 912 A1, DE 198 33 273 A1, U.S. Pat. No. 4,405,114 A, U.S. Pat. No. 5,469,677 A, EP 0 197 912 A2, EP 1 505 223 A1, EP 2 339 094 A1, WO 98/41709 A1.

BRIEF SUMMARY

One or more embodiments are directed to a device and a method which offers a simplified possibility, protected against adverse conditions, of applying tensile strength to a construction. More particularly the device and the method are to be designed in an improved manner with regard to tower structures. More particularly the device and the method are to enable comparatively simply and with reduced structural space long-term tensile strength which is protected against adverse conditions.

One embodiment includes an anchor, more particularly a fixed anchor, for a tensioning device designed for attachment to a structure, for holding tensile cords, such as wires, rods, more particularly tensile wires, tension rods or the like, on the anchor, with a multi-part anchor head, wherein the anchor head has:
- an anchor plate in the form of a perforated disc with through opening for separately passing through a tensile cord, wherein the through opening is one of a number of through openings and the tensile cord is one of a number of tensile cords,
- an intermediate disc mounted on one side of the perforated disc and having a further through opening for separately passing through the tensile cord, wherein the further through opening is one of a number of further through openings in the intermediate disc and the tensile cord is the one of the number of tensile cords.

According to one embodiment of the invention it is proposed that the intermediate disc is designed as a transition plate which supports at least in the further through opening a security sleeve which is designed to automatically anchor the tensile cord under tension.

The intermediate disc mounted on the one side of the perforated disc is, expressed differently, arranged on the underneath of the perforated disc, more particularly on an underneath side of the perforated disc facing away from the distal end of the anchor head.

More particularly it is proposed that a security sleeve is mounted in each of all further through openings of the number of further through openings.

Generally, besides a security sleeve, any type of tensile fastening element is suitable which is designed to automatically anchor the tensile cord under tension. More particularly the tensile cord or similar tension element is to be firmly surrounded and thereby firmly clamped.

One embodiment of the invention also leads to a tensioning device.

Another embodiment of the invention also leads, with regard to the device, to a wind energy plant.

The use of one or more embodiments of the invention is generally possible with advantage for a construction, more particularly for a tower. The use is however not restricted to a tower, more particularly not to a tower of a wind energy plant. In particular the use for towers of pre-stressed pre-fabricated concrete parts is not restricted to a tower for a wind energy plant, but can serve quite generally for use with industrial towers, such as by way of example a tower for an antenna support for telecommunications systems or the like.

According to one embodiment of the invention the intermediate disc is formed as a transition plate which supports at least in the further through opening a security sleeve which is designed to automatically anchor the tensile cord under tension and wherein the method has the steps:
- introducing a tensile cord at least into the through opening of the perforated disc and the further through opening of the transition plate
- placing the tensile cord under tension
- automatically anchoring the tensile cord in the perforated disc and the transition plate.

One embodiment stems from the consideration that an anchor as described as a multi-part anchor body in the prior art DE 198 58 001 A has fundamentally proved adequate but is still worthy of improvement. The invention has recognized that the anchor body, more particularly of an anchor head in the case of a fixed anchor, can be designed in an improved manner more compact and equally safely protected against adverse influences, if the perforated disc and the intermediate disc are designed for automatic anchorage.

For this it is proposed that the intermediate disc is designed as a transition plate which supports in a through opening a security sleeve or similar tensile fastening element which is designed to anchor the tensile cord automatically under tension.

Wires, preferably mono-wires, have proved particularly suitable as the tensile cords. By way of example wires can be formed from drilled filaments and housed in a PE-sheath which is filled with a corrosion-protecting mass.

It has proved particularly advantageous that at least one first of the tensile cords is provided with a different distinguishing feature which marks out at least the first tensile cord differently from a second tensile cord. More particularly it has proved advantageous if all tensile cords are provided with differing distinguishing features. More particularly a distinguishing feature is attached to a tensile cord in the area of an anchor position, preferably in the area of a fixed anchor position and/or in the region of a tension anchor position. By way of example a distinguishing feature can be attached at least in an area between the end of the tensile cord up to an area of an anchor position and surrounding same. The distinguishing feature can however also extend over the entire tensile cord.

A distinguishing feature can basically comprise any recognizable marking of a tensile cord in the state to be installed, which extends beyond a mere identification of the tensile cord based on its individual manufacturing features; more particularly a marking can be a visually striking mark. These and other modifications can allow, or at least help, assembly fitters to fasten the plurality of tensile cords on an anchor in the correct sequence. More particularly a colored marking of the tensile cord, preferably a completely solid coloring of the tensile cord, at least in the said region, has proved advantageous.

The further development is based on the consideration that each individual tensile cord, e.g., a first and a second tensile cord, is to be inserted at least into the through opening of the perforated disc and/or the further through opening of the transition plate. The further development also stems from the consideration that each individual first tensile cord is to run in its axial path along the structure, i.e., between the fixed anchor and tension anchor, as parallel as possible to a second tensile cord; in each case however cross-overs, twists or the like between the tensile cords are to be avoided. The further development has recognized that this is particularly well safeguarded if the tensile cords can be easily differentiated from one another, since then any deviation from a parallel arrangement, in each case cross-overs, twists or the like, can be recognized more easily.

In particular it was recognized that a correct sequential arrangement of the plurality of tensile cords on an anchor, i.e., preferably in the same sequence on the fixed anchor and tension anchor, can ensure this requirement. To this end, it has proved particularly advantageous to make all the tensile cords easily distinguishable from one another, e.g., to mark them with different colors and/or dye them different colors; at least at the end up into the area of a fixed anchor and/or tension anchor.

Particularly advantageously, through the distinguishing feature of the tensile cord, it is possible to indicate the assignment to a through opening of the perforated disc and/or the further through opening of the transition plate and/or a further position on the anchor. Particularly advantageously a first distinguishing feature of the first tensile cord is assigned to a first receiving feature of the anchor, more particularly the through opening, and a second distinguishing feature of the second tensile cord is assigned to a second receiving feature of the anchor more particularly the through opening, wherein the receiving features differ and the distinguishing features differ and the first distinguishing feature is assigned to the first receiving feature. In other words, it is preferred if each tensile cord can be clearly assigned to one through opening so that any deviation from a parallel arrangement, in each case cross-overs, twists or the like, of the tensile cords can be particularly reliably avoided.

Further advantageous and further developments of the invention can be concluded from the dependent claims and in detail provide advantageous possibilities for implementing the explained concept within the scope of the problem set as well as with regard to further advantages.

The perforated disc preferably supports in the through opening a ring-shaped anchor body which is designed to anchor a tensile cord on the perforated disc. Thus the further development offers an anchoring of the tensile cord both in the perforated disc and also in the transition plate. An anchorage is thus doubly secured and on the other hand the double anchorage of the tensile cord, particularly in the case of a wire inserted in a filled PE-sheath, leads to good results which is particularly relevant to the resistance to adverse environmental influences.

A security disc is preferably arranged on the other side of the perforated disc. This security disc enables a comparatively secure fastening of further parts of the anchor head, namely in particular it serves to connect a cover hood and/or cover cap. The security disc can be screwed on tight, more particularly with manually operated screws, such as a ring screw or the like.

On one side of the intermediate disc the anchor head can be fitted in particular on a setting ring of a foundation base. The anchor head is adapted underneath the intermediate disc with particular advantage to the shape of a setting ring.

The security disc preferably still has a further through opening for separately passing through the tensile cord. Within the scope of the preferred further development a tensile cord is guided through a through opening of the perforated disc, a further through opening of the transition plate as well as the still further through opening of the security disc. The disc system offers a particularly reliable anchorage and guidance of the tensile cord. In particular the number of through openings in the disc system is designed congruent with one another.

The setting ring preferably has an internal region which is common to the plurality of tensile cords so that the plurality of tensile cords can be guided jointly through the internal region. More particularly the setting ring has an opening which allows the plurality of tensile cords to be passed through.

The anchor head preferably has a cover which is mounted on the other side of the perforated disc and engages over same. The anchor head is thereby protected against damp or other adverse environmental conditions. More particularly the cover is designed so that it engages over the security disc and/or the perforated disc and/or the intermediate disc. The anchor head can be housed in the cover in the manner of a housing. A particularly good protection can be achieved by designing the cover as a system comprising a cover hood and a cover cap. The cover hood advantageously offers a protective cover for all parts of the anchor head. The cover cap advantageously has a protective tubular connector for a tensile cord. The tensile cord heads are thereby protected to a particular extent against the penetration of damp and moisture. The system offers a doubled protection against adverse environmental conditions.

The number of through openings in the discs is preferably arranged centro-symmetrically around an axis of the anchor; the tensile forces are thereby spread uniformly around the axis. Depending on the extent of the tensile forces different numbers of through openings can be selected and fixed by way of example by exchanging the discs. One disc can by way of example have 3, 7, 9, 12 or 16 centro-symmetrically arranged through openings. The system of the discs is preferably designed so that these, at least the perforated disc and the transition plate, can be set self-centered in one another. The number of through openings are preferably arranged in a through opening area which is off-set opposite a stop area. By way of example the stop area can be formed as a centro-symmetrical ring area and the through opening area can be formed as a centro-symmetrical circular area. The system of discs is thus laterally and axially self-aligned and the through openings can be brought to coincide without further adjustment. This enables a simple passage of the tensile cord through the through openings.

One through opening preferably receives a tensile fastening element, more particularly a security sleeve in the case of the transition plate, or an anchor body in the case of the perforated disc. A tensile fastening element or an anchor body can basically have different shapes; with particular advantage a cylindrical or an annular shape, since a tensile cord can thereby be enclosed on all sides. An annular tensile fastening element and/or anchor body preferably has a conical and a cylindrical section. The cylindrical section serves in particular for a secure axial insertion. The conical section can depending on the extent of a tensile force be drawn more or less deep into a through opening so that the clamping force on a tensile cord is measured according to the insertion depth of the conical section.

A through opening of the transition plate and/or perforated disc preferably has a smooth or structured inner sleeve side in order to hold a tensile fastening element and/or anchor element secure.

The anchor body and/or security sleeve is particularly preferably formed in the shape of a ring wedge. A ring wedge preferably has one or more expansion slits; these serve for correctly matching a clamping force to a tensile cord.

The inner sleeve side of a tensile fastening element and/or the anchor body is preferably toothed or provided with ribs or other structured elements which are suitable for pressing into a tensile cord. The structure is hardened in a particular way, in order to gain a greater hardness compared to a PE-sheath or a corrosion-protection mass or a steel mesh of a tensile cord. By way of example ribs can be provided with different spacing and different hardness. More particularly teeth can be provided with comparatively sharp edges.

BRIEF DESCRIPTION OF THE SEVERAL VIEWS OF THE DRAWINGS

Embodiments of the invention will now be described below with reference to the drawings and in comparison with the prior art which is likewise illustrated in part. The embodiments are not necessarily drawn to scale but rather the drawings, where serving for explanation, provide a diagrammatic and/or slightly distorted illustration. For supplementing the teachings which are directly discernible from the drawings, reference is made to the relevant prior art. It is thereby to be taken into consideration that numerous modifications and alterations regarding the shape and detail of an embodiment can be undertaken without deviating from the general idea of the invention. The features of the invention disclosed in the description, the drawings and in the claims can be essential both individually and also in any combination for the further development of the invention. Furthermore all combinations of at least two of the features disclosed in the description, the drawings and/or the claims fall within the scope of the invention. The general idea of the invention is not restricted to the exact form or detail of the preferred embodiment illustrated and described in the following, nor is it restricted to an object which would be restricted compared to the object claimed in the claims. In the case of the measurement ranges given, values lying within the said limits are also disclosed and can be used and claimed as boundary values. Further advantages, features and details of the invention are apparent from the following description of the preferred embodiments as well as from the drawings.

The drawings show in detail:

FIG. 1 a diagrammatic view of a wind energy plant in a preferred embodiment wherein the tower is formed with a number of tower segments placed against one another with tensile stress;

FIG. 2 shows the detail of a lower tower section of a tower of a wind energy plant as shown in FIG. 1, illustrating a tensioning device with a fixed anchor and a tensile anchor as well as a number of tensile cords held between the anchors, in a vertical cross-sectional view (A) and a horizontal cross-sectional view (B);

FIG. 4 shows in view (B) a perspective side view of the anchor head of FIG. 3 and in view (A) a detailed cross-sectional view of the anchor head;

FIG. 5 shows an intermediate disc formed as a transition plate according to an embodiment of the invention, with a plurality of further through openings, wherein each through opening serves for separately passing through a tensile cord in the form of a wire, wherein the views (A), (B), (C) are a cross-sectional view, a plan view and a perspective view of the transition plate;

FIG. 6 shows in views (A), (B), (C), (D), (E) the detail of a tensile fastening element in the form of a security sleeve for use in a through opening, illustrated in FIG. 5, of the transition plate in order to automatically anchor a tensile cord in the through opening under tension;

In FIGS. 1 to 9, for simplicity, the same reference numerals are used for the same or similar parts or parts having the same or similar function.

DETAILED DESCRIPTION

FIG. 1 shows a wind energy plant 1000 with a tower 1001 and a nacelle 1002 attached to the tower 1001. The nacelle 1002 supports a rotor 1003 with a number of, here, three, rotor blades 1004. A rotor blade 1004 of the rotor 1003 is connected via a hub 1005 to a shaft (not shown in further detail) in the nacelle 1002. For this, a rotor blade 1004 is attached by a blade bearing to a hub adapter and coupled to the shaft. When the rotor 1003 is rotated driven by the wind, a generator mounted in the nacelle 1002 can be driven by the shaft to produce power. The electric energy supplied by the generator can be converted by electric power converters, transformers or similar further suitable electric devices for feeding into a power network (not shown in further detail); the devices can be arranged in the nacelle 1002 or at the base 1010, in the tower 1001 or outside the tower 1001 of the wind energy plant 1000.

The tower 1001 of the wind energy plant 1000 is embedded in the base 1010 by a foundation shown in FIG. 2. The tower 1001 of the wind energy plant 1000 is built up from a number of tower segments 1100—by way of example as hollow cylindrical steel or pre-stressed concrete segments. A tower segment 1100 of an upper tower region arranged between the nacelle 1002 and base 1010, and shown in more detail by way of example in FIG. 2, has a lower retaining attachment 1110 for holding a fixed anchor 2100. A tensile cord 2200 can be passed through tower segments lying underneath, and here illustrated by way of example by 1200, and extends between the aforementioned fixed anchor 2100 and a tension anchor 2300 in a foundation, such as for example a basement component 1310 of the foundation base 1300 which is secured on the tower. The fixed anchor 2100, the tensile cord 2200 and the tension anchor 2300 are part of a tensioning device 2000 of which a number are arranged along a periphery of the tower in the manner described. View (B) of FIG. 2 shows for this purpose an angular section of a cross-section Q (as shown in view (A) in plan view on the lower area of the tower segment 1100; namely the attachment 1110 of the tower segment 1100. The number of tensioning devices 2000 are as can be seen spread out at comparatively small angular spacings around the periphery of the tower 1001 and in each case apply for the lower tower segments 1100 and 1200 a tensile stress which is achieved through the tensile cords 2200 which are tensioned between the fixed anchor 2100 and the tension anchor 2300.

Figure 3:
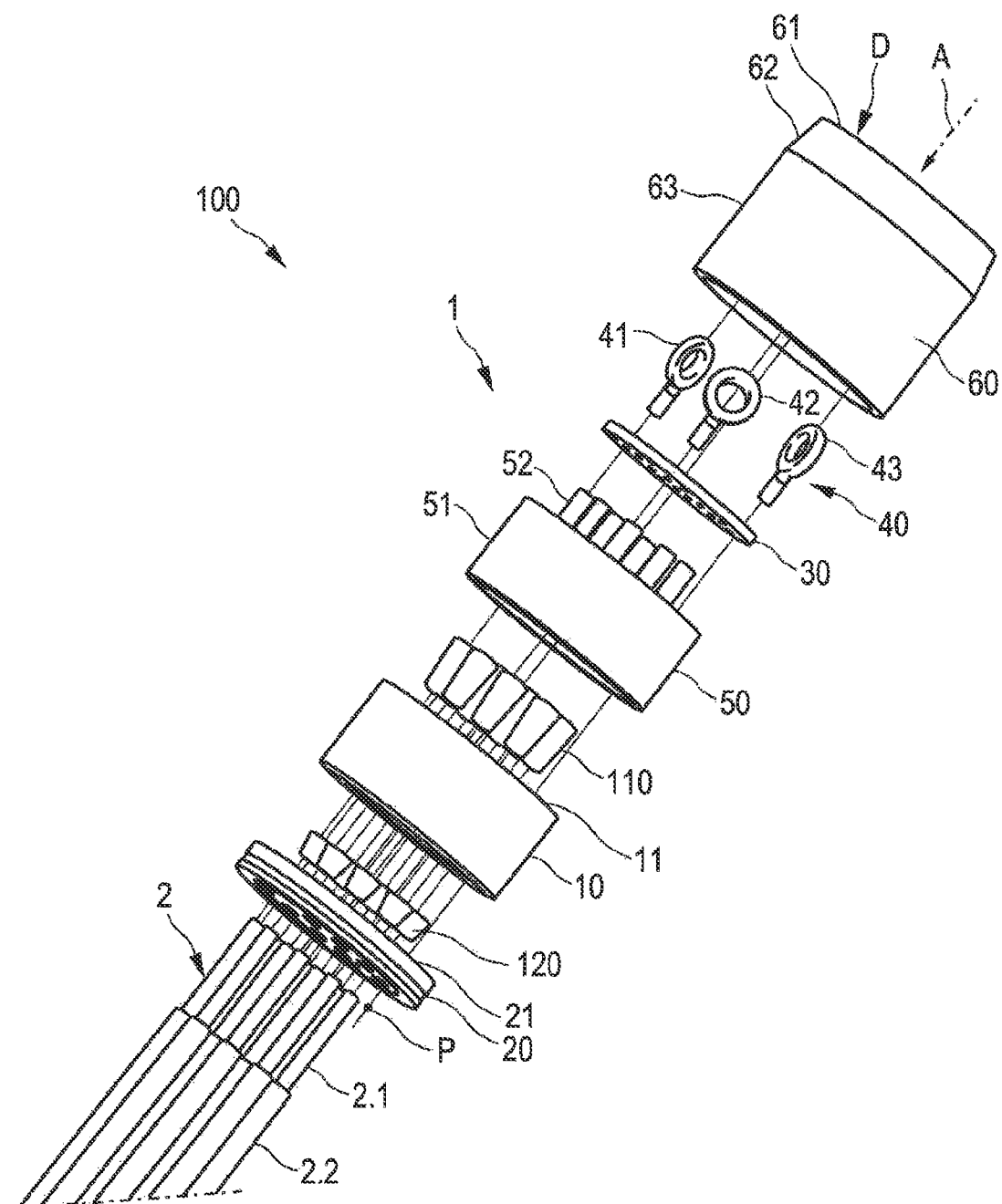
FIG. 3 shows a perspective exploded view of an anchor within the scope of a particularly preferred embodiment as a fixed anchor with a multi-part anchor head.

FIG. 3 shows in an exploded view an anchor 100 formed as a fixed anchor 2100. The anchor 100 has a multi-part anchor head 1 which serves for receiving with tension the tensile cords 2 which are here formed as mono-wires. A tensile cord 2 is formed as a drilled wire mesh 2.1 which is inserted in a PE-sheath 2.2 and cast there with a corrosion-protecting mass. The anchor head 1 has an anchor plate in the form of a perforated disc 10, an intermediate disc formed as a transition plate 20, and a security disc 30 which each have a through opening for individually passing through a tensile cord 2, wherein the through opening is one of a number of through openings in the corresponding disc.

In the present case, each individual tensile cord 2 for forming the tensile element 2200, e.g., a first and a second tensile cord, is inserted at least into a through opening 11 of the perforated disc and a further through opening 21 of the transition plate, and each individual first tensile cord runs in its axial path along the tower 1001, i.e., between the fixed anchor 2100 and tension anchor 2300, as parallel as possible to the second tensile cord. At least a first of the tensile cords 2200 can be provided with a different distinguishing feature which marks out at least the first tensile cord distinguishably from a second tensile cord. This can, but however need not, be the case. The terms underside and topside, or underneath side and upper side, as used in the following, refer to an axial direction A starting from a distal end D of the anchor head 1 to a proximal end P of the anchor head 1, i.e., thus like a tensioning device 2200 with a fixed anchor 2100 attached on the upper side and a tension anchor 2300 attached on the underneath side of the tensioning device, in the tower 1001 of the wind energy plant as shown in FIG. 2.

The intermediate disc formed as the transition plate 20 is accordingly mounted on the underneath of the anchor plates formed as the perforated disc 10. The security disc is correspondingly mounted on the upper side of the perforated disc 10.

A ring-shaped anchor body 110 is seated in a through opening 11 of the perforated disc. A number of ring-shaped anchor bodies 110 are provided accordingly, of which each one anchor body 110 is seated in each one through opening 11 of the perforated disc. A tensile fastening element, here in the form of a security sleeve 120, is seated in the further through opening 21 of the intermediate disc which is designed as the transition plate 20. A number of security sleeves 120 are provided accordingly wherein each one security sleeve 120 is seated in each one through opening 21 of the intermediate disc which is termed a transition plate 20 in the following.

The security disc 30 is fastened by a set of ring screws 40 on the perforated disc 10 wherein each one ring screw 41, 42, 43 passes through an opening in the security disc 30 and is turned in a threaded hole of the perforated disc 10. A cover cap 50 is thus fixed between the security disc 30 and the perforated disc 10.

The cover cap 50 has a cylindrical protective jacket 51 as well as a number of protective connectors 52. Each protective connector 52 is formed to hold an upper end of a tensile cord 2 and to tightly engage over same, i.e., a protective connector 52 is closed at the top side so that moisture is reliably prevented from entering into an upper end of a tensile cord 2. The protective jacket 51 of the protective cap 50 furthermore surrounds the perforated disc 10 and the intermediate disc 20 at the sides.

The cover cap 50 in turn is engaged by a cover hood 60 which has a protective cover 61 and an initially conically formed lateral jacket area 62 and a cylindrical jacket area 63, in order to fit as a whole over the aforementioned component parts of the anchor head 1 and thus to protect the anchor head 1 against dust, moisture as well as the penetration of any other adverse environmental factors.

Following one embodiment of the invention not only are the ring-shaped anchor bodies 110 formed, but also additionally the security sleeves 120 are formed to automatically anchor the tensile cord 2 under tension, namely in the perforated disc 10 and also in the intermediate disc 20. On the one hand this results in an improved anchorage effect for firmly anchoring a tensile cord 2. Through the simplified and synergistically tension-setting measure of a security sleeve 120 in the intermediate disc 20 this also leads to a tensile cord 2 being firmly fixed in the intermediate disc 20. Penetration of damp into a region underneath the transition plate 20 is thus particularly securely prevented. The interaction of the tensile stress and lateral compressive stress when tightening a tensile cord 2 in the through opening 21 by means of the security sleeve 120 also has an advantageous effect here; this effect becomes greater the more plastic the outer region of a tensile cord 2; here the PE-sheath and the inserted corrosion-protecting means between the PE-sheath 2.2 and the wire 2.1 have an additional sealing action in addition to the function previously described.

As a whole the transition plate 20 with the security sleeves 120 under tension produce an additional securing of the tensile cord 2 as a reliable seal against dampness.

The construction of a fixed anchor and the method of functioning thereof will now be explained further below with reference to FIG. 4. Initially FIG. 4 shows in view (B) a perspective side view of the fixed anchor 100 in the assembled form and in the inserted state; possibly to be regarded according to detail X of FIG. 2 and correspondingly designated is the tensioning device 2000 with the bundle 2220 of tensile cords of the previously explained type inserted in a protective tube 2210, possibly a number of tensile cords 2 of FIG. 3 for forming a tension element 2200 of FIG. 2. Presently a first of the tensile cords 2200 is provided with a differing distinguishing feature which marks out at least the first tensile cord distinguishably from a second tensile cord; in this way the assembly fitter is able in a particularly easy way to insert the tensile cords in the correct sequence into the through opening 11 of the perforated disc and a further through opening 21 of the transition plate so that these run as a parallel as possible in their axial path along the tower 1001, i.e., between the fixed anchor 2100 and the tension anchor 2300, in each case lie next to one another however completely and overall in the same sequence. In particular a distinguishing feature (not shown here) can be applied to a tensile cord to coincide with a receiving feature (not shown here) on a through opening 11 of the perforated disc and/or a further through opening 21 of the transition plate according to a predetermined assignment; in the simplest case, this can be a matching first sequence of colored markings on the tensile cords in the fixed anchor and tension anchor. In particular this can also in a further designated manner be a matching of a sequence of colored markings on the through openings 11 of the perforated disc and the further through openings 21 of the transition plate or another point of an anchor 100.

The anchor head 1 as described above is housed with its parts underneath the closed cover hood 60 and holds the tensile cords 2 firm when tensile stress is applied.

View (A) of FIG. 4 shows a cross-sectional view of the anchor head 1 on the attachment 1110 of the tower segment 1100 by way of example. A foundation base 2230 thus formed supports a setting ring 3 on which the anchor head 1 is placed. The setting ring is formed as a steel ring for the stabilized defined insertion of the anchor head 1, and is placed in the foundation base 2230 in a suitable way, by way of example is concreted in or the like. The internal opening O of the tube 2210 in the foundation base 2230 is sufficiently dimensioned to receive the number of tensile cords. With regard to the anchor head 1 reference is made in the following to the above description, wherein in FIG. 4 the same reference numerals are used for the same or similar parts or for parts of the same or similar function. More particularly the discs which fit into or onto on another, namely the intermediate disc in the form of the transition plate 20, the anchor plate in the form of the perforated disc 10 and the security disc 30 which is fitted thereon, can be seen here wherein the perforated disc 10 is fixed laterally, more particularly is fixed centered, against the transition plate 20 with a centro-symmetrical attachment profile P12. The centro-symmetrical profile P12 has for this an inner circular central region and an outer ring-shaped region. Likewise between the steel ring 3 and the intermediate disc there is a further centro-symmetrical profile P23 which likewise allows a centered fitting of the transition plate 20 in the steel ring, i.e., the setting ring 3. The security disc 30 is here held by a screw connection, such as the set of screws 40, on the perforated disc 10 and thereby clamps the cover cap 50 on a distal end D of the tensile cords 2, of which one is shown by way of example in FIG. 4 view (A), as it is engaging in a protective connector 52 of the cover cap 50.

Figure 7:
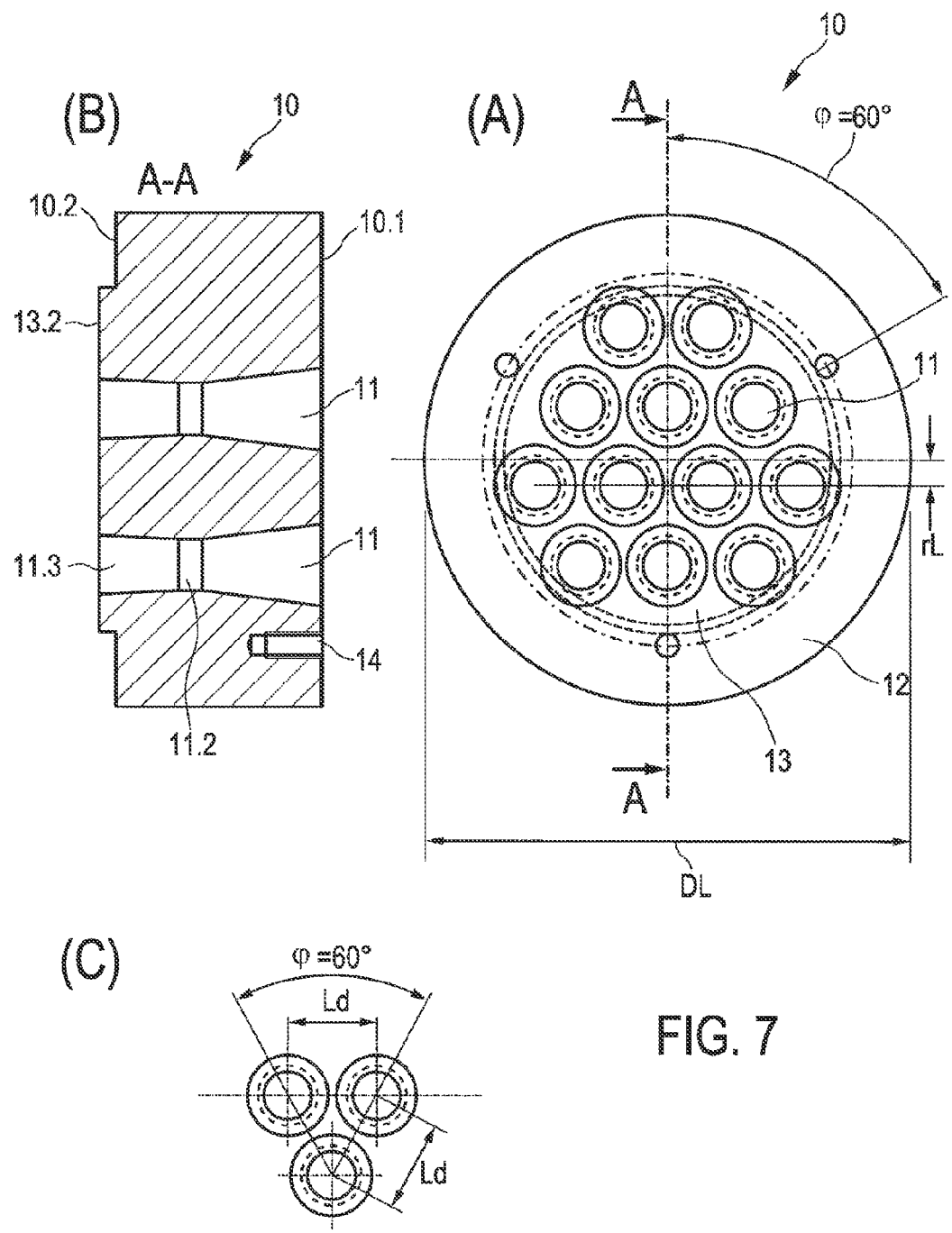
FIG. 7 shows the detail of a perforated disc of the anchor head illustrated in FIG. 3 and FIG. 4, in views (A), (B), (C), as cross-sectional view, as plan view and a detail of a grid of the number of through openings in the perforated disc.
Figure 8:
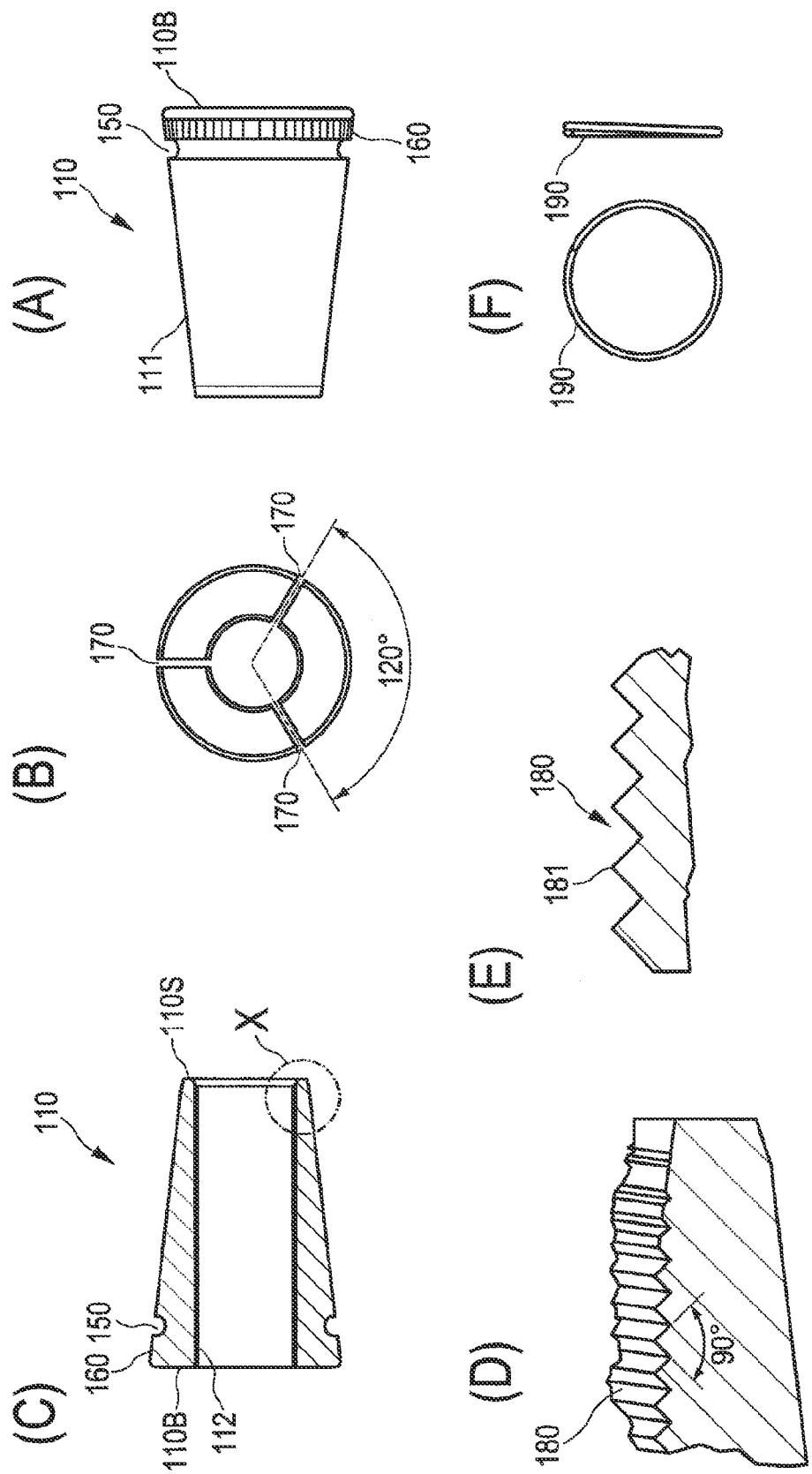
FIG. 8 shows in views (A) to (F) the detail of an anchor body for use in a through opening of the perforated disc illustrated in FIG. 7.

The tensile cord 2 is—as fundamentally explained previously—firmly set on the one hand under tension by means of a ring-shaped anchor body 110 in the perforated disc 10, which is further described as a wire wedge in FIG. 8, wherein the perforated disc 10 is shown in detail in FIG. 7.

The tensile cord 2 is fixed by means of a security sleeve 120 inserted in the transition plate 20. Like the ring-shaped anchor body 110 the security sleeve 120 is also designed to anchor a tensile cord 2 under tension; as a result the tensile cord 2 is thus anchored both in the perforated disc 10 and in the transition plate 20. The transition plate 20 is described in further detail in FIG. 5 and the security sleeve in detail in FIG. 6.

With regard first to FIG. 5, this shows in view (C) the transition plate 20 in a perspective view; in the following description reference will also be made to the plan view of view (B) and the cross-sectional view (A).

The intermediate disc designed as the transition plate 20 is here designed to support in one through opening 21 of a number of through openings, a security sleeve 120 which is designed to anchor the tensile cord 2 automatically under stress. The transition plate 20 has for this initially here a number of twelve through openings 21 in a centro-symmetrical and in a triangular-orientated geometry about the axis A. The through openings 21 are for this purpose spaced substantially equally at a distance Zd and are arranged at the corner points of an isosceles and equilateral triangle, i.e., along axes at an angle of $\phi=60°$ relative to one another. Other arrangements are likewise possible, by way of example an arrangement also of 3, 7, 9, 12, 15 or 16 centro-symmetrical through openings 21.

Just with reference to FIG. 7, a similar grid is shown in view (C) and view (B) of FIG. 7 for the perforated disc 10. From the detail of the grid shown in view (C) of the FIG. 7 can be seen a spacing Ld of through openings which corresponds to the spacing Zd. Also the angle $\phi=60°$ is the same. The arrangement of the through openings 21 in the intermediate disc 20 and the arrangement of the through openings 11 in the perforated disc 10 coincide with one another. Similarly a diameter D1 of the perforated disc 10 is equal to a diameter Dz of the intermediate disc. Also the radii rz and rl of the through openings 21, 11 are identical, the aforementioned also applies with regard to the security sleeve 30.

As can further be seen from FIG. 5, the number of through openings 21 is, like the through openings 11, arranged in a through opening region 23 which is off-set relative to a stop area 22. Correspondingly the number of through openings 11 are arranged in a through opening area 13 off-set relative to a stop area 12. The stop area is here formed as a centro-symmetrical ring area. The off-set through opening area 13 is formed as a circular area arranged around the axis A.

As can be seen in concrete form from FIG. 5 view (A), the off-set through opening area 23 of the transition plate 20 is formed by a countersunk area 23.1 sunk centro-symmetrically on an upper side 20.1 and an insert area 23.2 raised centro-symmetrically on an underneath side 20.2; these each with the same diameter d23 which is equal to the inner diameter of the stop area 22. A countersunk distance S1, S2 is here identical and furthermore a countersunk distance S1 of the countersunk area corresponds roughly to an indent measurement of a security sleeve 120. The indent measurement corresponds roughly to that distance S1 between a tension-free and a tension-stressed position of the security sleeve. In other words, the security sleeves 120 can be inserted into a through opening 21 with a slight overhang in S1 in the countersunk region 23. As can further be seen from FIG. 5 view (A), a through opening 21 is formed with an upper upwardly conically opening through opening section 21.1 and a lower cylindrical through opening section 21.2.

As is apparent from FIG. 6 and the security sleeve 120 described there, this sleeve has on the outside a virtually conical shape so that it can be fitted in the cylindrical through opening area 21.2 of the through opening by increasing the compressive stress on a tensile cord 2 after the security sleeve 120 is first to be inserted in the conical through opening area 21.1.

View (E) of FIG. 6 shows for this the security sleeve 120 as a ring wedge with a single clamping slit 130 extending continuously along the sleeve length L120. The contour of the security sleeve 120 shown in view (A) of FIG. 6 has a slightly conical design of the outer sleeve side 121 of the security sleeve 120, this with a conical angle $\alpha$ of here about 7°. The inner side 122 of the security sleeve 120 shown in view (E) and along the section line B-B of view (B) of FIG. 6 is structured with a rib arrangement 140. A rib 141 of the rib arrangement 140 on the inside 122 of the security sleeve 120 is shown in view (D) of FIG. 6. A rib 141 has a virtually triangular cross-section with rounded tip wherein the arms of the triangle form a rib angle of $\beta=60°$.

The spacing of the ribs 141 in the rib arrangement 140 is as shown in the view (B) of FIG. 6 virtually the same. Both the symmetrical alignment of one rib flank according to angle $\beta$ and also the equal spacing of a rib in the case of the rib arrangement 140 is here shown by way of example for explanation. By way of example in one modification the rib spacings vary in one rib arrangement, by way of example increase or decrease from a narrow edge 120S to a broad edge 120B of the security sleeve. Also an alignment of the rib 141 can be provided in any direction against the direction of the broad edge 120B. Such or similar measures can serve to support a canting of a rib 141 or the rib arrangement 140 at a tensile cord, more particularly a PE-sheath with corrosion-protecting mass and steel drilled wires underneath.

The clearance 130S of the clamping slit 130 amounts here roughly to the width of one rib or lies in the region of a tenth of the diameter 120D of the security sleeve, preferably between 5 and 15% of a mean diameter or an inner diameter 120Di, preferably below 10% of an outer diameter 120Da.

FIG. 7 shows further in view (A) the design of a through opening area 13 off-set compared to a stop area 12. The through opening area 13 of the perforated disc 10 is restricted to a raised insert area 13.2 on the underneath side 10.2 of the perforated disc 10. On the upper side 10.1 of the perforated disc 10 the perforated disc is designed essentially planar. The upper side 10.1 has threaded openings 14 for the ring screws 41, 42, 43 shown in FIG. 3.

A through opening 11 of the perforated disc 10 has a first conically tapering section 11.1, a second substantially cylindrical middle region 11.2 and a conically widening region 11.3. The conicity of the first through opening area 11.1 is greater than the conicity of the third through opening area 11.3.

As a result of the countersunk area 23.1 of the transition plate 20 the latter is suitable for a tight-fitting centering location of a through opening area 13 of the perforated disc 10, namely the insert area 13.2 thereof. The insert area 23.2 of the transition plate in turn is adapted with close fit to an insert area of a setting ring 3 so that the perforated disc 10 can be inserted into the transition plate 20 and the transition plate 20 can be inserted centered into the setting ring 3. A lower stop area 20.2 is thereby produced for stopping on the setting ring. An upper stop area 20.1 of the transition plate 20 comes to a stop on the lower stop area 10.2 of the perforated disc 10.

The flat surface 10.1 of the perforated disc in turn serves for the flat bearing of the cover cap 50 and the security disc 30 above as previously described.

The ring-shaped anchor body 110 adapted in shape for insertion in a through opening 11 of the perforated disc 10 is shown in FIG. 8. The anchor body 110 has a continuously conical outer sleeve face 111 which supports at a broad end 110B initially a ring groove and furthermore a rimmed ring section 160. The security sleeve 120 and also the anchor element 110 are formed from an elastomer material with an increased core hardness and a slightly softer surface hardness.

The sleeve face 111 supports expansion grooves 170 spread around the periphery in 120° sections, the clearance of which lies clearly below that of the clearance 130S of the security sleeve 120.

An inner side 112 of the ring-shaped anchor body has teeth 180 wherein the tips of one tooth 181 are sharp-edged. More particularly the teeth 180 are again hardened compared with the core hardness.

View (F) of FIG. 8 shows in a plan view F1 and a side view F2 a spring ring 190 as can be inserted in the spring groove 150.

Figure 9:
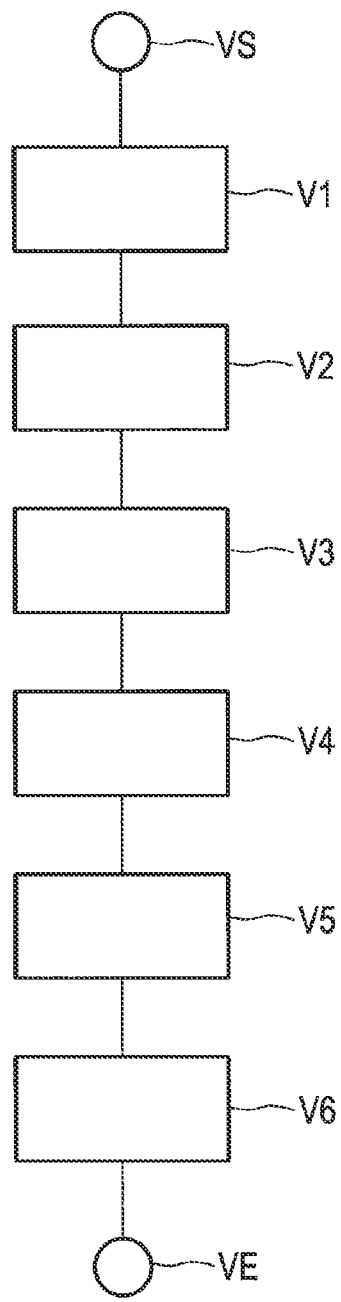
FIG. 9 shows a flow chart of a method for tensioning the tensile cords on a fixed anchor of FIG. 3.

A flow chart of FIG. 9 shows an example of a possible flow of a method for tensioning tensile cords on a fixed anchor 100 of FIG. 3 and FIG. 4. After the start VS of the method, in a first step V1 the insertion takes place of a tensile cord at least into the through opening of the perforated disc and the further through opening of the transition plate. In a further method step V2 the tensile cord is placed under tension. In a further method step V3 the automatic anchoring of the tensile cord takes place in the perforated disc 10 and in the method step V4 the anchoring takes place of the tensile cord 2 in the transition plate 20. After applying the cover elements in a method step V5 and filling same in a method step V6 with corrosion-protecting mass, the method is initially terminated substantially in step VE.

The invention claimed is:

1. An anchor for a tensioning device designed for attachment on a construction for holding tensile cords on the anchor, the anchor comprising:
   an anchor head including:
      a perforated disc having a first side and a second side and a plurality of first through holes for receiving tensile cords, a ring-shaped anchor body supported by the perforated disc and configured to anchor the tensile cords on the perforated disc,
      an intermediate disc mounted on the first side of the perforated disc and having a plurality of second through holes, each of the second through holes for receiving a respective one of the tensile cords,
      a plurality of security sleeves supported by the intermediate disc, the plurality of security sleeves being configured to anchor the tensile cords under tension, and
      a security disc arranged on the second side of the perforated disc, the security disc including a third plurality of through holes for receiving the tensile cords, respectively.

2. The anchor according to claim 1, wherein a setting ring is mounted on a first side of the intermediate disc.

3. The anchor according to claim 2, wherein the setting ring has at least one of:
   a stop for the intermediate disc and is designed for embedding in a foundation base; and
   an inner open area that corresponds to the total diameter of the tensile cords so that the tensile cords are provided together through the inner open area.

4. The anchor according to claim 1, wherein the anchor head further has:
   a cover arranged at the second side of the perforated disc, wherein the cover engages over at least one of the perforated disc and the intermediate disc.

5. The anchor according to claim 4, wherein the cover is a system comprising a cover hood closed on the second side, and a cover cap, wherein the cover hood has a protective cover and the cover cap has a protective connector for one of the tensile cords.

6. The anchor according to claim 1, wherein the plurality of first, second, and third through holes are arranged centro-symmetrically around an axis of the intermediate disc, the perforated disc and the security disc.

7. The anchor according to claim 1, wherein the plurality of first and second through holes are arranged in open areas of the perforated disc and intermediate disc, respectively, that are off-set relative to a stop area.

8. The anchor according to claim 7, wherein the stop area is a centro-symmetrical ring area.

9. The anchor according to claim 7, wherein the open area of the intermediate disc has a counter-sunk area that is sunk centro-symmetrically on an upper side, and an insert area raised centro-symmetrically on a lower side.

10. The anchor according to claim 9, wherein:
    the counter-sunk area of the intermediate disc is designed for receiving an open area of the perforated disc;
    the insert area of the intermediate disc is designed for insertion in a setting ring and a stop area arranged on a first side of the intermediate disc is designed for stopping against the setting ring; and
    a stop area arranged on a second side of the intermediate disc is designed for stopping against the perforated disc.

11. The anchor according to claim 9, wherein a sunk distance of the counter-sunk area corresponds approximately to an indent measurement of the security sleeve, wherein the indent measurement corresponds to a distance between a tension-free and a tension-loaded position of the security sleeve.

12. The anchor according to claim 1, wherein the plurality of second through holes of the intermediate disc has a smooth or structured inner sleeve side which is thread-free.

13. The anchor according to claim 1 wherein the plurality of second through holes has a first conical section and a second cylindrical section.

14. The anchor according to claim 1, wherein at least one of the ring-shaped anchor body and the plurality of security sleeves is formed in a shape of a ring wedge.

15. The anchor according to claim 1, wherein the anchor body has a plurality of expansion slits.

16. The anchor according to claim 1, wherein each of the plurality of security sleeves has a clamping slit that extends continuously along a length of the sleeve.

17. The anchor according to claim 1, wherein at least one of the plurality of security sleeves and the anchor body has a conical outer sleeve side.

18. The anchor according to claim 1, wherein at least one of the plurality of security sleeves and the anchor body has a cylindrical toothed inner sleeve side.

19. The anchor according to claim 1, further comprising an inner sleeve having teeth and is directed asymmetrically to a first side of the anchor.

20. A tensioning device, designed for attachment on a construction and for holding tensile cords on an anchor according to claim 1.

21. The tensioning device according to claim 20, further comprising:
a fixed anchor and a tension anchor, wherein tensile cords are held between the fixed anchor and the tension anchor, wherein the anchor head is of the fixed anchor and is designed for fixing the tensile cords before and after tensioning, and the anchor head of the tension anchor is designed for tensioning and then fixing the tensile cords.

22. A wind energy plant comprising:
a foundation including a tension anchor;
a tower including a plurality of tower segments;
an anchor according to claim 1 coupled to a first one of the plurality of tower segments, wherein the first one of the plurality of tower segments includes tensile cords that are held under tension by the anchor and the tension anchor;
a nacelle on the tower; and
a wind-drivable rotor on the nacelle and coupled to a rotor hub on a generator.

23. A method for tensioning tensile cords of a fixed anchor for a tensioning device designed for attachment on a construction and for holding the tensile cords between the fixed anchor and a tension anchor, wherein the fixed anchor has a multi-part anchor head, the method comprising:
introducing a first end of a tensile cord into a first through hole of a perforated disc of the fixed anchor and a second through hole of a transition plate of the fixed anchor, wherein a second end of the tensile cord located in the tension anchor is located in a foundation;
setting the tensile cord under tension; and
anchoring the tensile cord to the perforated disc and the transition plate.

24. The method according to claim 23, wherein the tensile cord is encased and fixedly clamped in the perforated disc and in the transition plate.

25. The method according to claim 23, wherein introducing comprises inserting a plurality of tensile cords into a plurality of first through holes of the perforated disc of the fixed anchor and a plurality of second through holes of the transition plate of the fixed anchor, wherein a first one of the plurality of tensile cords is provided with a feature that distinguishes the first one of the plurality of tensile cords from a second one of the plurality of tensile cords.

26. A wind energy plant comprising:
a foundation including a tension anchor;
a tower including a plurality of tower segments;
an anchor coupled to a first one of the plurality of tower segments, the anchor including a plurality of tension cords held under tension by the anchor, the anchor comprising an anchor head that includes:
a perforated disc having a first side and a second side and a plurality of first through holes for receiving tensile cords,
an intermediate disc mounted on the first side of the perforated disc and having a plurality of second through holes, each of the second through holes for receiving a respective one of the tensile cords, wherein the intermediate disc is formed as a transition plate that supports security sleeves designed to anchor the tensile cords under tension, and
a security disc arranged on the second side of the perforated disc, the security disc including a third plurality of through holes for receiving the tensile cords, respectively;
a nacelle on the tower; and
a wind-drivable rotor on the nacelle and coupled to a rotor hub on a generator.

* * * * *